(12) United States Patent
Kudo

(10) Patent No.: US 7,822,772 B2
(45) Date of Patent: Oct. 26, 2010

(54) DATA PROCESSOR

(75) Inventor: Yasuhiro Kudo, Ichinomiya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 356 days.

(21) Appl. No.: 12/003,554

(22) Filed: Dec. 28, 2007

(65) Prior Publication Data

US 2008/0215600 A1 Sep. 4, 2008

(30) Foreign Application Priority Data

Dec. 28, 2006 (JP) ............. P2006-355217

(51) Int. Cl.
G06F 17/30 (2006.01)
(52) U.S. Cl. ............. 707/790; 707/802; 707/803; 707/804; 707/805; 707/999.1
(58) Field of Classification Search ......... 707/821, 707/822, 823, 790, 802, 803, 804, 805; 715/764, 715/765, 767, 772, 967, 975
See application file for complete search history.

(56) References Cited

U.S. PATENT DOCUMENTS

| | | | |
|---|---|---|---|
| 5,687,385 A | 11/1997 | Janay | |
| 6,658,622 B1 | 12/2003 | Aiken et al. | |
| 7,234,118 B1* | 6/2007 | Bleizeffer et al. | 715/764 |
| 7,720,395 B2* | 5/2010 | Ikeno | 399/8 |
| 7,733,348 B2* | 6/2010 | Katahira et al. | 345/543 |
| 7,734,095 B2* | 6/2010 | Tojo | 382/190 |

FOREIGN PATENT DOCUMENTS

| | | |
|---|---|---|
| JP | 2-121031 | 5/1990 |
| JP | 10-254665 | 9/1998 |

(Continued)

OTHER PUBLICATIONS

Japanese Office Action, with English translation, issued in Japanese Patent Application No. JP 2006-355217, mailed Nov. 18, 2008.

(Continued)

Primary Examiner—Jean M Corrielus
(74) Attorney, Agent, or Firm—Baker Botts L.L.P.

(57) ABSTRACT

A data processor requires setting a plurality of items to a plurality of data sets. The data processor includes a setting unit, a determining unit, a first prompting unit, and a second prompting unit. The setting unit sets an item to a data set. The first prompting unit prompts the setting unit to change the setting of an item from the currently setting item by the setting unit to remaining one of the plurality of items other than the currently setting item when the determining unit determines that a data set which is set for the currently setting item satisfies a prescribed condition for the data set of the currently setting item. The second prompting unit prompts the setting unit to change a setting of an item from the currently setting item by the setting unit to one of the items that has been previously set by the setting unit when the determining unit determines that a data set which is set for the currently setting item is out of conformance with a prescribed condition for the data set of the currently setting item.

10 Claims, 6 Drawing Sheets

FOREIGN PATENT DOCUMENTS

| | | |
|---|---|---|
| JP | 2001-34379 | 2/2001 |
| JP | 2003-8762 | 1/2003 |
| JP | 2003-99170 | 4/2003 |
| JP | 2006-163974 | 6/2006 |

OTHER PUBLICATIONS

European Search Report issued in European Patent Application No. 07255054.4-2211 dated Apr. 28, 2008.

http://support.microsoft.com/kb/882677, with English translation, retrieved Dec. 28, 2007.

* cited by examiner

DATA PROCESSOR

CROSS REFERENCE TO RELATED APPLICATIONS

This application claims priority from Japanese Patent Application No. 2006-355217 filed Dec. 28, 2006. The entire content of each of these priority applications is incorporated herein by reference.

TECHNICAL FIELD

The present invention relates to a data processor and a method for controlling a data processor capable of implementing a prescribed function, computer-readable storage medium storing a set of program instructions executable on a data processor capable of implementing a prescribed function, and particularly to a data processor and a method capable of reducing the complexity and difficulty in a method of setting a plurality of settings that must be inputted to implement a prescribed function.

BACKGROUND

Recent data processors sometimes require the input of values for a plurality of settings in order to implement a single function. In these cases, a setup method, such as that described in http://support.microsoft.com/kb/882677, is often provided to guide a user sequentially through the steps of setup to facilitate inputting values for a plurality of settings. In this setup method, one item for which a setting is to be inputted, a description of the setting, and the like are displayed. After the user inputs data for the displayed item, the next item to be set and its description are displayed. Since this setup method allows the user to sequentially configure settings while viewing a description of the settings, the user need not be familiar with network systems to perform the setup process.

SUMMARY

However, in the Setup method described above for guiding the user step-by-step through the setup process, if the user inputs an incorrect value for any one of the plurality of settings that does not correspond to the system supported by the data processor, the data processor displays an error message, for example, after all settings have been inputted, requiring the user to repeat the entire setup process step-by-step.

In such a case, the user is unable to determine which of the plurality of settings is not supported by the data processor. As a result, the user might re-input the same unsupported value for the setting when repeating the setup process. In other words, a data processor is configured to display an error message after all settings have been entered. Thus, the data processor requires a complex operation in which the user must repeat the setup process several times. As a result, it is difficult for users unfamiliar with the setup method to complete the setup.

In view of the foregoing, it is an object of the present invention to provide a data processor and a data-processing program capable of reducing the complexity and difficulty in a method of setting a plurality of settings that must be inputted to implement a prescribed function.

In order to attain the above and other objects, the invention provides a data processor that requires setting a plurality of items to a plurality of data sets in order to implement a prescribed function. The data processor includes a storing unit, a setting unit, a determining unit, a first prompting unit, and a second prompting unit. The setting unit sets an item to a data set. The determining unit determines whether a data set which is set for an item by the setting unit satisfies a prescribed condition required for the data set of the item. The first prompting unit prompts the setting unit to change the setting of an item from the currently setting item by the setting unit to remaining one of the plurality of items other than the currently setting item when the determining unit determines that a data set which is set for the currently setting item satisfies a prescribed condition for the data set of the currently setting item. The second prompting unit prompts the setting unit to change a setting of an item from the currently setting item by the setting unit to one of the items that has been previously set by the setting unit when the determining unit determines that a data set which is set for the currently setting item is out of conformance with a prescribed condition for the data set of the currently setting item.

According to another aspects, the invention provides a method for controlling a data processor that requires setting a plurality of items to a plurality of data sets in order to implement a prescribed function. The method includes setting an item to a data set, determining whether a data set which is set for an item by the setting satisfies a prescribed condition required for the data set of the item, prompting the setting to change the setting of an item from the currently setting item by the setting to remaining one of the plurality of items other than the currently setting item when the determining determines that a data set which is set for the currently setting item satisfies a prescribed condition for the data set of the currently setting item, and prompting the setting to change a setting of an item from the currently setting item by the setting to one of the items that has been previously set by the setting when the determining determines that a data set which is set for the currently setting item is out of conformance with a prescribed condition for the data set of the currently setting item.

According to still another aspects, the invention provides a computer-readable storage medium storing a set of program instructions executable on a data processor that requires setting a plurality of items to a plurality of data sets in order to implement a prescribed function. The data processor stores at least one candidate for a data set. The program instructions includes setting an item to a data set, determining whether a data set which is set for an item by the setting satisfies a prescribed condition required for the data set of the item, prompting the setting to change the setting of an item from the currently setting item by the setting to remaining one of the plurality of items other than the currently setting item when the determining determines that a data set which is set for the currently setting item satisfies a prescribed condition for the data set of the currently setting item, and prompting the setting to change a setting of an item from the currently setting item by the setting to one of the items that has been previously set by the setting when the determining determines that a data set which is set for the currently setting item is out of conformance with a prescribed condition for the data set of the currently setting item.

DETAILED DESCRIPTION

Figure 1:
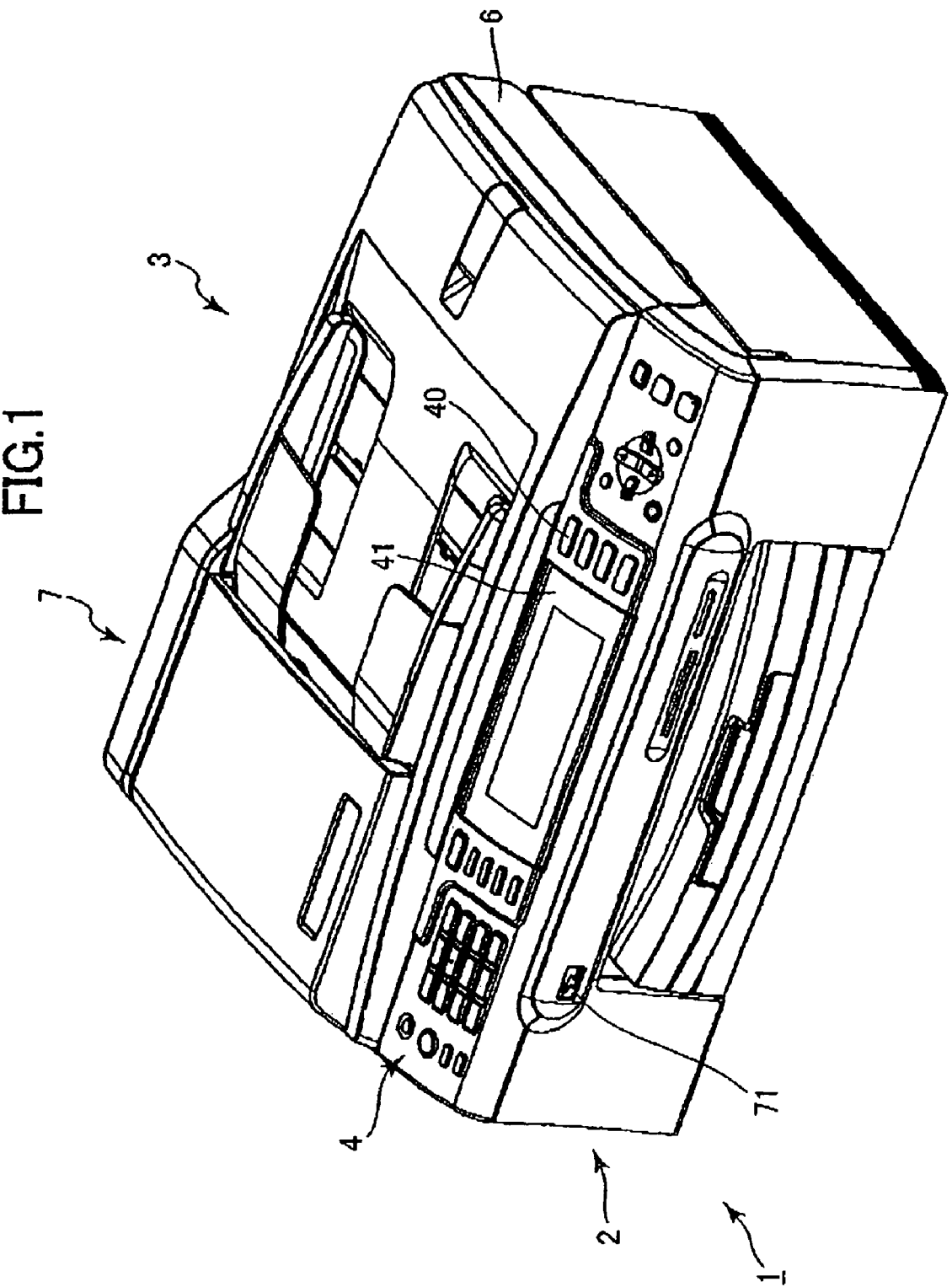
FIG. 1 is a perspective view showing the outer structure of a multifunction peripheral according to an embodiment of the invention.

A first embodiment of the present invention will be described while referring to the accompanying drawings. FIG. 1 is a perspective view showing the outer structure of a multifunction peripheral 1 according to the first embodiment. As shown in FIG. 1, the multifunction peripheral 1 is integrally configured of a printer 2 disposed on the bottom, a scanner 3 disposed on the top, and a control panel 4 provided on the front surface of the scanner 3. The multifunction peripheral 1 implements a scanner function, a copier function, and a facsimile function.

Generally, the multifunction peripheral 1 is connected to a computer (not shown), including computers existing on a network. The multifunction peripheral 1 can record text and images on recording paper based on text and image data received from the computer. The scanner 3 includes a document scanning bed 6, and an automatic document feeder (hereinafter abbreviated as "ADF") 7 and functions to scan images from an original document placed on the document scanning bed 6 or loaded in the ADF 7. The printer 2 records images on recording paper based on image data scanned by the scanner 3 or image data inputted from an external source.

The control panel 4 provided on the front surface of the multifunction peripheral 1 enables the user to control the printer 2 and the scanner 3 by inputting parameters for various settings. The control panel 4 includes various operating keys 40, and a liquid crystal display (LCD) 41. Using the control panel 4, the user can also input desired commands. When a prescribed command is inputted into the multifunction peripheral 1, a controller 20 (see FIG. 2) controls the operations of the multifunction peripheral 1 based on the inputted data. In addition to commands inputted through the control panel 4, the multifunction peripheral 1 is configured to operate based on commands transmitted from a computer connected to the multifunction peripheral 1 via a printer driver, a scanner driver, and to implement operations and functions based on commands received from a computer (external device) on the network via the network interface 30 (see FIG. 2).

Figure 2:
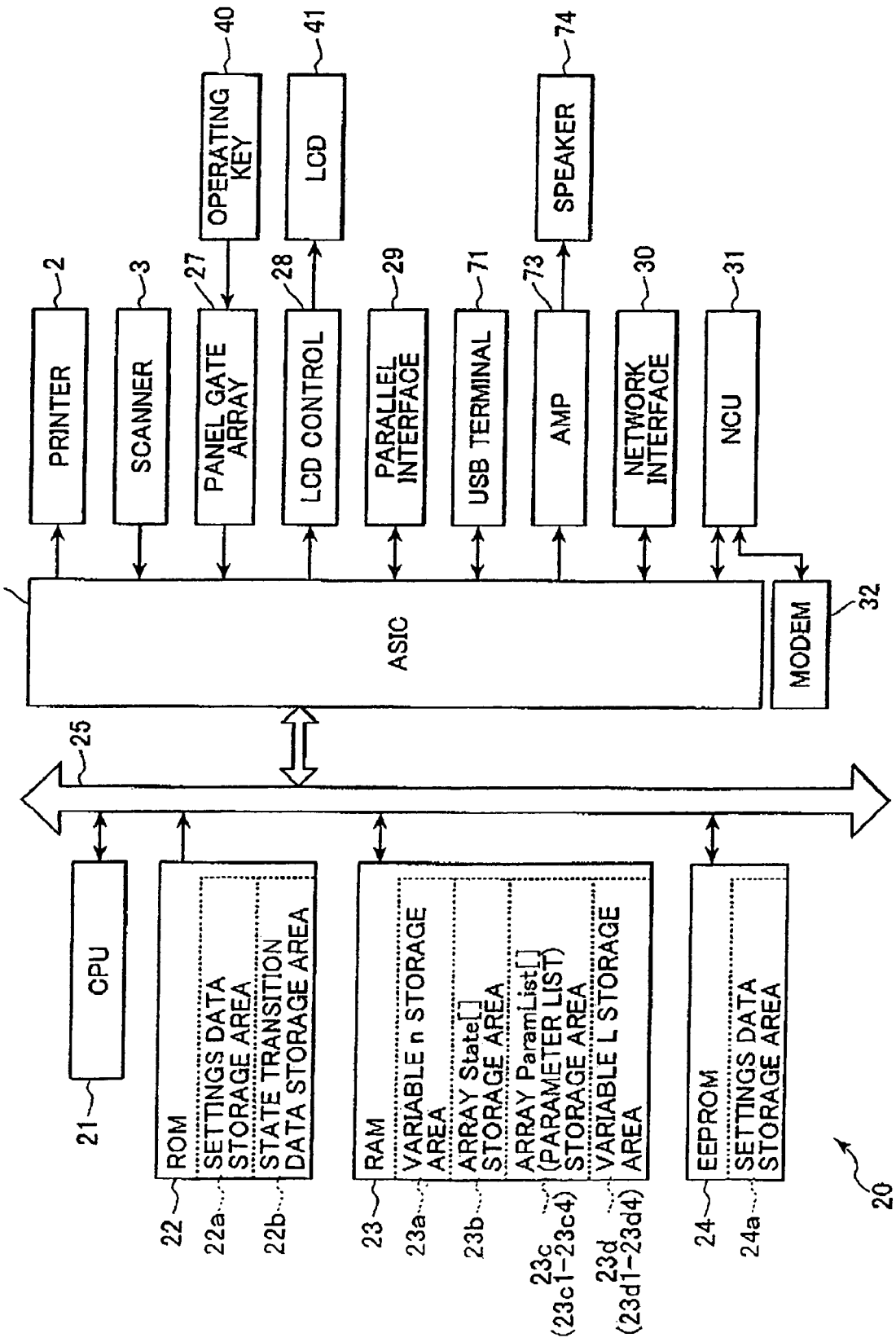
FIG. 2 is a block diagram showing the overall structure of a controller in the multifunction peripheral.

Next, the general structure of the controller 20 provided to control the operations of the multifunction peripheral 1 will be described with reference to FIG. 2. FIG. 2 is a block diagram showing the structure of the controller 20 in the multifunction peripheral 1. The controller 20 functions to control the overall operations of the multifunction peripheral 1, including the printer 2, the scanner 3, and the control panel 4. As shown in FIG. 2, the controller 20 is configured of a microcomputer primarily including a central processing unit (CPU) 21, a read-only memory (ROM) 22, a random access memory (RAM) 23, and an electrically erasable and programmable ROM (EEPROM) 24, which is a rewritable, nonvolatile storage device. The controller 20 is connected to an application specific integrated circuit (ASIC) 26 via a bus 25.

The CPU 21 is a central processor that performs overall control of the multifunction peripheral 1. The CPU 21 implements various programs, such as a program implementing the process shown in the flowcharts of FIGS. 4, and 6.

The ROM 22 stores programs for controlling various operations of the multifunction peripheral 1. The ROM 22 also includes a settings data storage area 22a, and a state transition data storage area 22b.

The settings data storage area 22a stores parameters for settings required for establishing a connection with a computer on the network. Priority values for selection are also assigned to the respective port numbers, communication methods, and authentication methods and stored in the settings data storage area 22a. In the embodiment, settings data stored in the settings data storage area 22a includes the server name "unknown"; the port numbers "995" (priority 1), "110" (priority 2), and "unknown" (priority 3); the communication methods "SSL" (priority 1), and "plain" (priority 2); the authentication methods "none" (priority 1), "plain" (priority 2), and "APOP" (priority 3); the username "unknown"; and the password "unknown".

The state transition data storage area 22b stores state transition data describing events, and next states for state transitions described later. In the embodiment, the state transition data stored in the state transition data storage area 22b stores, as the state transition data, "S1→connection process (settings: server name, port number)? S2:S6", "S2→communication method determining process (settings: communication method)? S3:S1", "S3→authentication method determining process (settings: authentication method)? S4:S5:S2", "S4→login process (settings: username, password)? S5:S3", "S5→terminating process", and "S6→error display process".

The state transition data indicates information between a single state and or at least one state to which the one state transit. The state transition data also indicates a setting condition by which the one state proceeds to the at least one state. More specifically, the state transition data "S1→connection process (settings: server name, port number)? S2:S6" indicates that the state S1 proceeds to the states S2 if a result of a connection process based on the set server name and port number is positive, and the state S1 proceeds to the state S2 if a result of the connection process based on the set server name and port number is negative. Where, the connection process requires setting a server name and a port number.

The state transition data "S2→communication method determining process (settings: communication method)? S3:S1" indicates that the state S2 proceeds to the states S3 if a result of a communication method determining process based on the set communication method is positive and the state S2 proceeds to S1 if a result of the communication method determining process based on the set communication method is negative. The communication method determining process requires setting a communication method.

The state transition data "S3→authentication method determining process (settings: authentication method)? S4:S5:S2" indicates that the state S3 proceeds to the states S4 if a result of the authentication method determining process based on the set authentication method is positive, the state S3 proceeds to the state S5 if the communication method set in S2 does not require an authentication, that is, "none" is set as the authentication method (described later), and the state S3 proceeds to the state S2 if a result of the authentication method based on the set authentication method determining process is negative.

The state transition data "S4→login process (settings: username, password)? S5:S3" indicates that the state S4 proceeds to the states S5 if a result of a login process based on the set username and password is positive, and the state S4 proceeds to the state S3 if a result of the login process based on the set username and password is negative. The state transition data "S5→terminating process" indicates that the state S5 proceeds to a terminating process.

The state transition data "S6→error display process" indicates that the state S6 proceeds to an error display process. The state transitions for S1-S6 will be described later with reference to FIG. 3.

The RAM 23 is used as a storage area for temporarily storing various data used when the CPU 21 executes the above programs, or as a work area. The RAM 23 is provided with a variable n storage area 23a, an array State[ ] storage area 23b, an array ParamList[ ] (parameter list.) storage area 23c, and a variable L storage area 23d.

Figure 4:
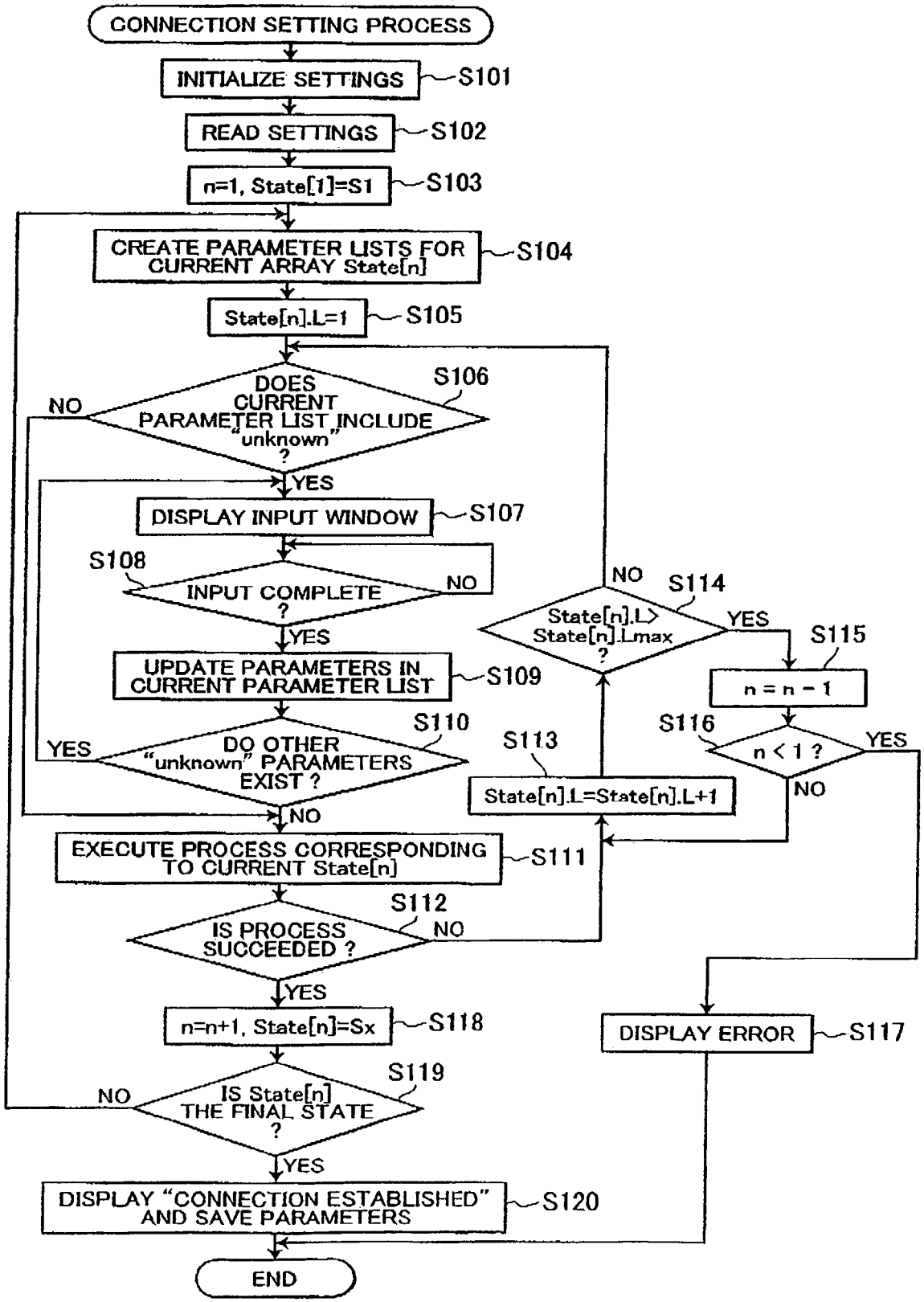
FIG. 4 is a flowchart illustrating steps in a connection setting process executed by a CPU in the multifunction peripheral.

The variable n storage area 23a stores a value of the variable n set in the connection setting process described in FIG. 4. The array State[ ] storage area 23b stores numbers corresponding to each state (S1-S6) set in the connection setting process of FIG. 4 and stores the order in which S1-S6 have been executed as an array. The array ParamList[ ] storage area 23c further includes storage areas 23c1-23c4 for each state, each of which storage areas stores parameter lists used in the respective states S1-S4. The variable L storage area 23d further includes storage areas 23d1-23d4 for each state (S1-S4), each of which storage areas stores values corresponding to the parameter lists selected in the connection setting process.

The EEPROM 24 is a rewritable, nonvolatile storage device and includes a settings data storage area 24a. The settings data storage area 24a stores values of settings established for a computer on the network in the connection setting process.

The ASIC 26 controls the operations of the printer 2, the scanner 3, and the control panel 4 according to commands from the CPU 21. A panel gate is connected to the ASIC 26 for controlling the operating keys 40 by which the user inputs desired commands into the multifunction peripheral 1 . When prescribed key codes are received from the panel gate array 27, the CPU 21 performs an appropriate control process according to a prescribed key process table. The key process table associates key codes with key processes and is stored in the ROM 22, for example.

The ASIC 26 is also connected to an LCD controller 28, a parallel inter face 29, a USB terminal 71, an AMP 73, the network interface 30, and a network control unit (NCU) 31.

The LCD control 28 is connected to the ASIC 26 for controlling the content displayed on the LCD 41. The LCD control 28 displays information related to operations of the printer 2 or the scanner 3 on the LCD 41 based on commands from the CPU 21. The parallel interface 29 and the USB terminal 71 are connected to the ASIC 26 for exchanging data with the computer via a parallel cable or a USB cable. The network control unit (NCU) 31 and a modem 32 are connected to the ASIC 26 for implementing the facsimile function. The amp 73 is connected to the ASIC 26 and to a speaker 74. The amp 73 outputs sounds to the speaker 74, including ringtones, error tones, and messages.

The network interface 30 is connected to the ASIC 26 for connecting with computers on the network. The network interface 30 is capable of connecting to a plurality of computers on the network and for exchanging data with these computers.

Next, a method for establishing a connection between the multifunction peripheral 1 and a computer on the network will be described with reference to FIGS. 3 through 5. A process for establishing a connection between the multifunction peripheral 1 and a computer on the network is executed when the user operates the operating keys 40 and selects the "Establish Connection" function among the plurality of available functions.

State transitions in the connection setting process performed when the user selects the function "Establish Connection" will be described next with reference to FIG. 3. FIG. 3 is a flowchart showing state transitions in a connection setting performed on the multifunction peripheral 1 . That is, FIG. 3 is a state transition diagram based on the state transition data stored in the state transition data storage area 22b.

Figure 3:
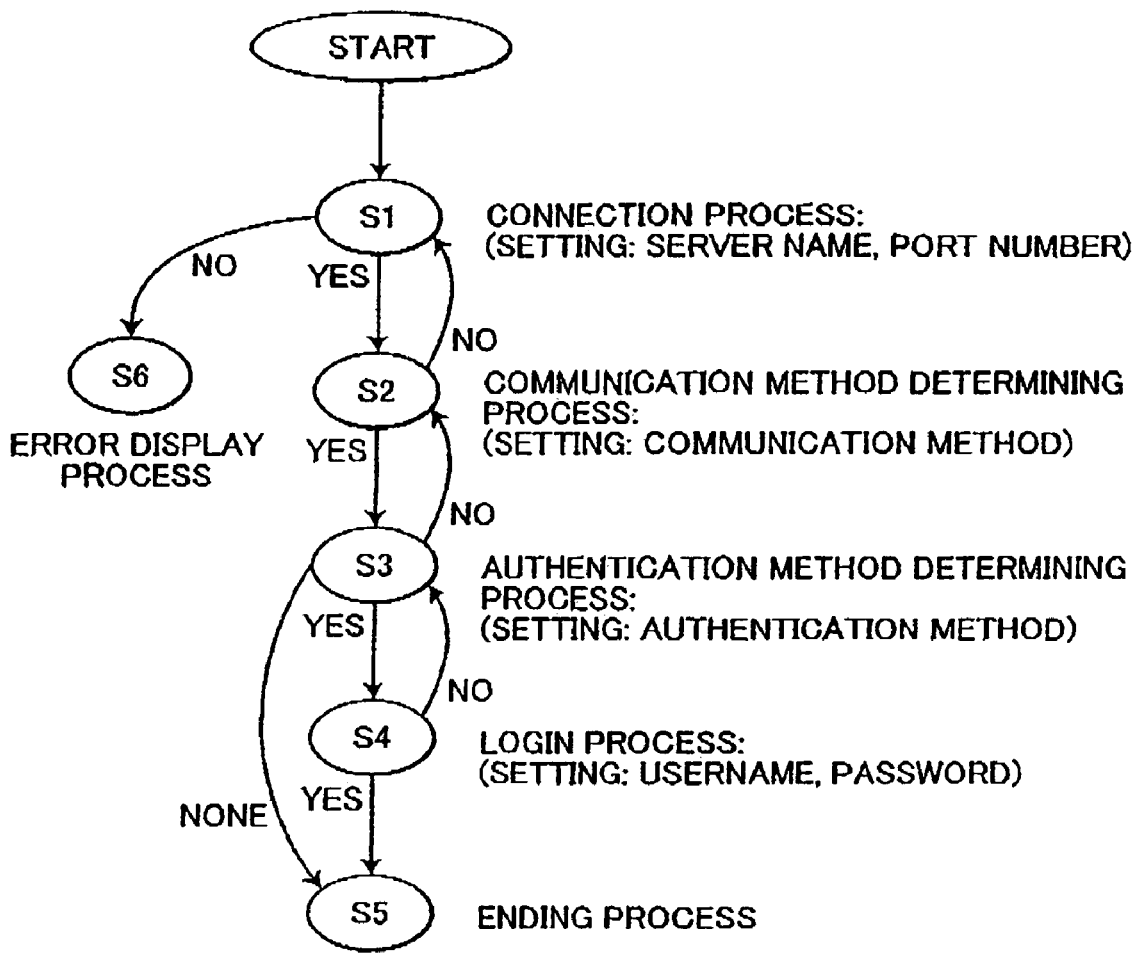
FIG. 3 is a flowchart showing state transitions in a connection setting performed on the multifunction peripheral.

As shown in FIG. 3, after the "Establish Connection" function has been selected, based on the state transition data "S1→connection process (settings: server name, port number)? S2:S6", the server name and port number are established as one setting, and the connection process is performed based on this server name and port number. The server name specifies the address of the computer on the network, while the port number specifies the type of data being exchanged with the computer specified by the server name. Hence, after the server name and port number have been set, in S1 the multifunction peripheral 1 initiates a connection with the computer specified by the server name and determines whether the type of data specified by the port number is supported.

By the state transition data "S1→connection process (settings: server name, port number)? S2:S6", the transition of the state S1 is determined as follows. From the state S1, if a computer corresponding to the established server name and port number exists on the network, then a connection can be established. After the connection is established (S1:YES), the process transitions to the state S2. However, if a computer corresponding to the established server name and port name does not exist on the network in the state S1, a connection cannot be established. When the multifunction peripheral 1 (the CPU 21) determines that no connection has been established after a timeout (S1: NO), then the multifunction peripheral 1 (the CPU 21) transitions to the state S6. And, as shown in the state transition data "S6→error display process", the multifunction peripheral 1 (the CPU 21) displays an error message on the LCD 41, such as "Connection error."

In the state S2, based on the state transition data "S2→communication method determining process (settings: communication method)? S3:S1", a communication method is set as one setting and the multifunction peripheral 1 (the CPU 21) determines in the communication method determining process whether the communication method is supported by the computer with which a connection has been established in the state S1.

By the state transition data "S2→communication method determining process (settings: communication method)? S3:S1", the transition of the state S2 is determined as follows. If the established communication method is supported by the computer on the network (S2: YES), the multifunction peripheral 1 (CPU 21) transitions to the state S3. However, if the communication method is not supported by the computer on the network (S2: NO), then the multifunction peripheral 1 transitions to the state S1 and repeats the process for setting the server name and port number.

In the state S3, based on the state transition data "S3→authentication method determining process (settings: authentication method)? S4:S5:S2", an authentication method is established as one setting, and the multifunction peripheral 1 (the CPU 21) determines in the authentication method determining process whether the established authentication method is supported by the computer on the network determined to support the communication method in the state S2.

By the state transition data "S3→authentication method determining process (settings: authentication method)? S4:S5:S2", the transition of the state S3 is determined as follows. If the established authentication method is supported by the computer on the network (S3: YES), the multifunction peripheral 1 (the CPU 21) transitions to the state S4. However, if the authentication method is not supported (S3: NO), then the multifunction peripheral 1 transitions to the state S2 and repeats the process for setting the communication method. Alternatively, if the computer determined in the state S2 to support the communication method does not perform authentication (S3: none), that is, the computer does not require the authentication, then the multifunction peripheral 1 (the CPU 21) transitions to the state S5. As shown in the state transition data "S5→terminating process", the multifunction peripheral 1 (the CPU 21) displays a message on the LCD 41, such as "Connection established," and ends the connection setting process.

In the state S4, based on the state transition data "S4→login process (settings: username, password)? S5:S3", a username and password are established as one setting, and the multifunction peripheral 1 (the CPU 21) determines in the login process whether the username and password match a username and password supported by the computer on the network. This determination is made based on whether the username and password set in S4 match a username and password stored in the computer on the network.

By the state transition data "S4→login process (settings: username, password)? S5:S3", the transition of the state S4 is determined as follows. If the username and password established in S4 match a username and password supported by the computer (S4: YES), then the multifunction peripheral 1 (the CPU 21) transitions to the state S5, displays the message "Connection established" on the LCD 41, and ends the connection setting process. However, if the username and password are not supported by the computer (S4: NO), then the multifunction peripheral 1 (the CPU 21) transitions to the state of S3 and repeats the process for setting the authentication method.

As described above, the states S1-S4 are configured for sequentially configuring settings and can therefore guide the user sequentially through the setup process. Further, the states S2-S4 are configured to return to the preceding state when the value of a setting (communication method, authentication method, username, and password) is not supported so that the user can input new data. Accordingly, a user performing this setup process can recognize which of the settings is not supported by the computer on the network. Therefore, a user unfamiliar with networks can identify an unsupported setting and input a different value for that setting, thereby reducing the complexity and difficulty of the setup process.

Next, the connection setting process executed by the CPU 21 of the multifunction peripheral 1 for transitioning among states S1-S6 in FIG. 3 will be concretely described with reference to FIGS. 4 and 5. FIG. 4 is a flowchart illustrating steps in the connection setting process executed by the CPU 21 in the multifunction peripheral 1. FIG. 5 is an explanatory diagram showing the state of parameters stored in the parameter lists. As described above, the connection setting process is executed when the user operates the operating keys 40 and selects the "Establish Connection" function from among the plurality of available functions.

In S101 at the beginning of the connection setting process, the CPU 21 initializes settings. After initialization is complete, the CPU 21 advances to S102. The initialization process performed in S101 functions to initialize unnecessary data by setting an initial value (such as "0") for data stored in the variable n storage area 23*a* and storage areas 23*d*1-23*d*4 of the variable L storage area 23*d*, and by erasing data stored in the array State[ ] storage area 23*b* and the storage areas 23*c*1-23*c*4 of the array ParamList[ ] storage area 23*c*.

In S102 the CPU 21 reads settings data stored in the settings data storage area 22*a* and state transition data stored in the state transition data storage area 22*b*. As described above, the settings data read in S102 includes the server name "unknown"; the port numbers "995" (priority 1), "110" (priority 2), and "unknown" (priority 3); the communication methods "SSL" (priority 1), and "plain" (priority 2); the authentication methods "none" (priority 1), "plain" (priority 2), and "APOP" (priority 3); the username "unknown"; and the password "unknown", while the state transition data read in S102 includes "S1→connection process (settings: server name, port number)? S2:S6", "S2→communication method determining process (settings: communication method)? S3:S1", "S3→authentication method determining process (settings: authentication method)? S4;S5:S2", "S4→login process (settings: username, password)? S5:S3", "S5→terminating process", and "S6→error display process".

In S103 the CPU 21 sets a variable n to 1 and sets the value of the array State[1] to S1. The value of the variable n is stored in the variable n storage area 23*a*, while the value of the array State[n] is stored in the initial storage area of the array State [ ] storage area 23*b*. Hence, a value "1" is stored in the variable n storage area 23*a*, while S1 is stored in the initial storage area of the array State[ ] storage area 23*b*.

In S104 the CPU 21 creates parameter lists (ParamList [State[n].L]) from a combination of settings for the value (one of S1-S4) in the current array State[n] and stores the parameter lists in the array ParamList[ ] storage area 23*c*. In the following description and in FIG. 4, a variable L of State[n] is expressed as "State[n].L". Further, State[n].L varies from an initial value of 1 to a maximum value of State[n].Lmax. That is, in S104, the CPU 21 creates the parameter lists ParamList [State[n].L] where State[n].L varies between 1 to State[n]. Lmax Since the current value of State[n] is S1 in S104, the CPU 21 creates parameter lists corresponding to the state S1 and stores these lists in the array ParamList[1] storage area 23*c*1.

Here, the process of creating the parameter lists will be described. Since the settings in S1 include the server name and port number and the server name has the single parameter "unknown" while the port number has three parameters "995", "110", "unknown", there are three possible combinations of server names and port numbers. Hence, ParamList [ ]=[unknown·995, unknown·110, unknown·unknown], producing the parameter lists shown in (a-1) of FIG. 5. In this case, since the number of the combinations of the server names and the port numbers are three, State[1].Lmax=3. The parameter lists shown in (a-1) of FIG. 5 are configured of ParamList[1] (where state[1].L=1) having the server name "unknown" and the port number "995", ParamList[2] (where state[1].L=2) having the server name "unknown" and the port number "110", and ParamList[3] (where state[1].L=3) having the server name "unknown" and the port number "unknown". The parameter lists are created in order from highest priority associated with the port number parameter value.

After creating the parameter lists in S104, in S105 the CPU 21 sets the variable L to a value 1. The CPU 21 stores the value 1 in the variable L storage area 23*d*, and advances to S106. Since the current State[n] is S1, a value 1 is stored in the variable L storage area 23*d*1. Since the State[n] is currently S1 and the variable State[n].L is set to 1, the top row of the parameter list shown in (a-1) of FIG. 5 is specified.

In S106 the CPU 21 determines whether the parameter list specified in S105 includes the parameter value "unknown". If the specified parameter list does not include "unknown" (S106: NO), then the CPU 21 skips to S111.

However, if the parameter list includes the parameter value "unknown" (S106: YES), then in S107 an input window is displayed on the LCD 41 prompting the user to input the parameter value. In S108 the CPU 21 determines whether the user has completed input and waits while input is not complete (S108: NO).

Figure 5:
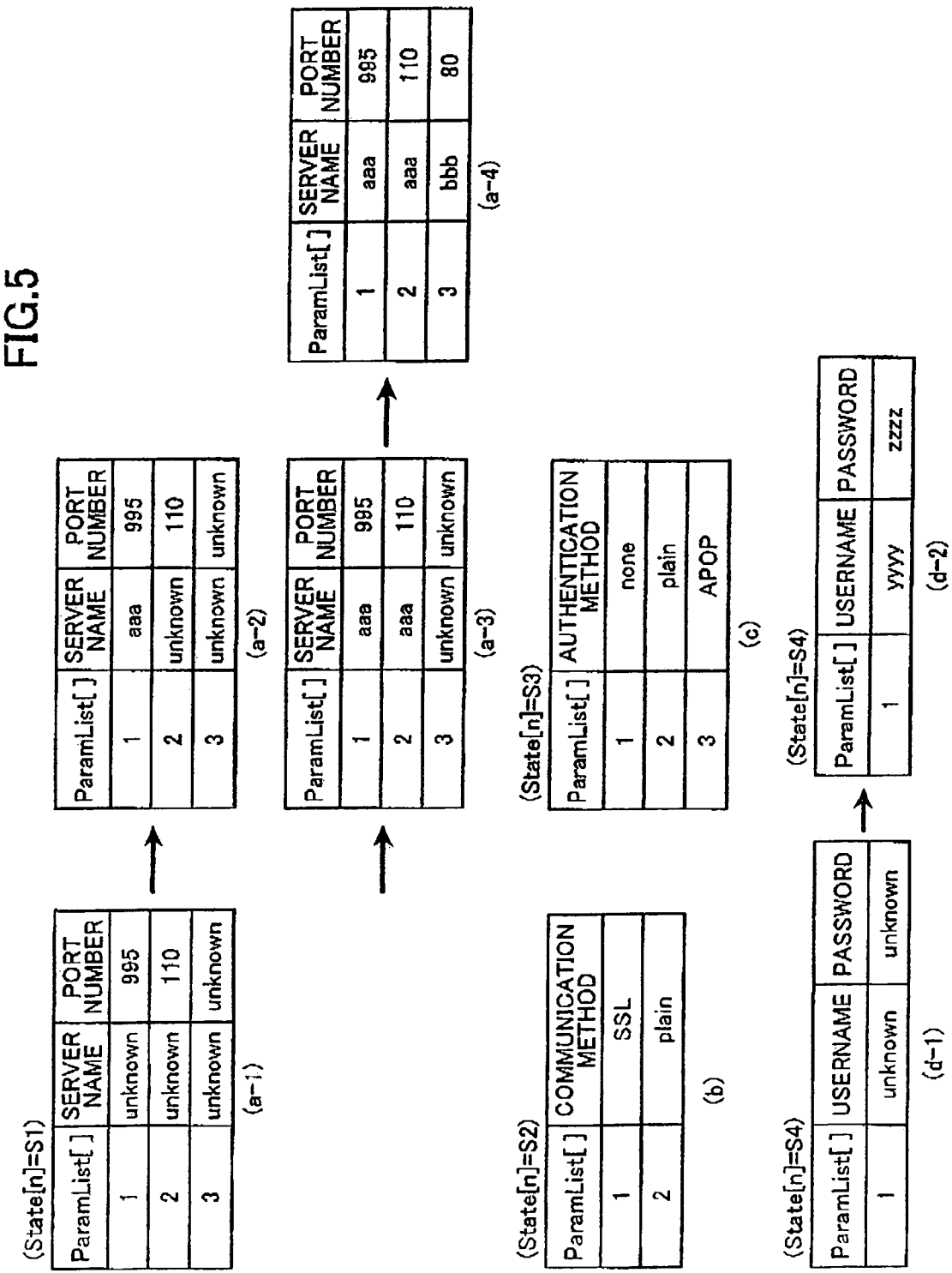
FIG. 5 is an explanatory diagram showing the state of parameters stored in parameter lists.

Since the top row of the parameter list is currently designated in (a-1) of FIG. 5, the CPU 21 displays a server name input window on the LCD 41 in S107 and determines whether the user has completed input based on whether the user has inputted a server name using the operating keys 40 and pressed a Set key (not shown: included in the operating keys 40). In the following description, it will be assumed that the user has inputted "aaa" as the server name.

When the CPU 21 determines that the user has completed input of a server name (S108: YES), in S109 the CPU 21 updates the parameter value of ParamList [State[n].L]. Since "aaa" has been inputted as the server name in this state, the value stored in the array ParamList[1] storage area 23c1 for ParamList [State[1].L] is that shown in (a-2) of FIG. 5. That is, "aaa" is stored in the top row of the parameter list.

In S110 the CPU 21 determines whether the specified parameter list includes another value "unknown". If the parameter list includes "unknown" (S110: YES), then the CPU 21 returns to S107 and prompts the user to input a new parameter value. If the parameter list does not include "unknown" (S110: NO), then the CPU 21 advances to S111. Since the server name is "aaa" and the port number "995" in the current state, the parameter list does not include "unknown" (S110: NO), and the CPU 21 advances to S111.

In S111 the CPU 21 executes a process corresponding to the current State [n] (one of S1-S4) by using the item of the parameter list (one row of the parameter list as shown in FIG. 5) specified by State[n].L. Here, the CPU 21 execute the process shown in the state transition data for the current State[n].

In S112 the CPU 21 determines whether the process corresponding to the current State[n] succeeded or failed. Specifically, in S112 the CPU 21 determines based on the state transition data read in S102 whether the process succeeded or failed as shown in the events of FIG. 3.

Since the current state is S1, the process executed in S111 is the connection process in which the CPU 21 initiates a connection with the computer on the network based on the specified server name. If there is a computer corresponding to the specified server name on the network, then the CPU 21 determines whether the computer supports the specified port number. Hence, the CPU 21 determines that a connection has been successfully established (S112: YES) if there exists a computer on the network with the corresponding server name and port number. The CPU 21 determines that a connection could not be established after a timeout (S112: NO) if such a computer does not exist on the network.

If the process corresponding to the current State[n] (S1-S4) has been successful (S112: YES), then the CPU 21 advances to S118 in order to transition to the next state. However, if the process has been unsuccessful (S112: NO), then the CPU 21 advances to S113 in order to set the next parameter candidate.

In S113 the CPU 21 increments the variable State[n].L by 1 to specify the next parameter candidate and advances to S114. Since the variable State[n].L is currently 1, the CPU 21 sets the variable State[n].L to 2 in S113 and stores this value in the variable L storage area 23d1. By setting the variable State[n].L to 2, the CPU 21 specifies the middle row of the parameter list in (a-1) of FIG. 5.

In S114 the CPU 21 determines whether the variable State [n].L is greater than a variable State[n].Lmax in order to determine whether all parameter candidates have been selected from the parameter list. Lmax indicates the number of ParamList[ ] arrays, i.e., the number of combinations of parameter candidates for the current state (one of S1-S4). If all parameter candidates have not been selected for the current state S1-S4 (S114: NO), then the CPU 21 returns to S106 to repeat the process in S106-S112 based on the parameter candidate specified in S113.

However, if all parameter candidates have been selected from the parameter list in the current state (one of S1-S4), indicated by the variable State[n].L being greater than the variable State[n].Lmax (S114: YES), then the above process failed for all parameter candidates in the current state (one of S154). Accordingly, in S115 the CPU 21 decrements the variable n by 1 in order to transition to the previous state and advances to S116. The value of the variable n is stored in the variable n storage area 23a at this time.

Further, by decrementing the variable n in S115, the CPU 21 references the array in the array State[ ] storage area 23b, transitioning to the preceding state. Subsequently, the CPU 21 deletes the current value of the state in the array State[ ] storage area 23b. For example, if the array State[ ] storage area 23b stores S1 and S2 in this order, that is, the current state is S2 and the state returns to S1, then in S115 the CPU 21 deletes the value of the current state S2 from the array State[ ] storage area 23b. Thus, in S115 the array State[ ] storage area 23b stores only the state S1. By deleting the present failed state in the array State[ ] storage area 23b when returning to the previous state, the CPU 21 can determine the current state and the succeeded state in the determination of S112 from the array State[ ] storage area 23b.

In the embodiment, the values of the variable n do not always correspond to the values of State[n] (S1-S5). As described above, since there are some cases in which the multifunction peripheral 1 transitions from the state S3 to the state S5, the value of State[n] may be S5 when the variable n is 4. In other words, the value of the variable n does not correspond to the number in the array of State[n]. The correspondence between the variable n and the number in the array of State[n] is determined by the state transition data.

In S116 the CPU 21 determines whether the value stored in the variable n storage area 23a is less than 1. If the variable n is less than 1 (S116: YES), then since the multifunction peripheral 1 is currently in the state S1 and cannot transition to a preceding state, in S117 the CPU 21 displays a message such as "Connection error" on the LCD 41 (state S6 in FIG. 3) and ends the connection setting process.

While the message "Connection error" is displayed on the LCD 41 in S116 in the example described above, the CPU 21 may instead output "Connection error" by voice. through the speaker 74, or may output the messages to both the LCD 41 and speaker 74. Being notified of the connection error in this way, the user can restart the connection setting process from the beginning and set "unknown" to a different value.

However, if the value stored in the variable n storage area 23a is 1 or greater (S116: NO), then the current state of the multifunction peripheral 1 is at least the state S2 or a subsequent state. Therefore, the CPU 21 advances to S113 to specify the next parameter candidate for the state set in S115, incrementing the variable State[n].L by 1, and subsequently returns to S114.

In this way, values stored in the storage areas 23d1-23d4 are saved until the connection setting process ends so that a previously selected parameter list is not selected again when transitioning to the preceding state, that is, the variable n is decremented in S115. In other words, each of the storage areas 23d1-23d4 stores the variable L, for each state (S1-S4), that specifies the latest row of the parameter list of each state (FIG. 5) that has been selected. Hence, once specified, a parameter list is considered processed and cannot be specified again. By preventing parameter values from being selected more than once in the connection setting process, the multifunction peripheral 1 can quickly execute the connection setting process and establish a connection setting quickly.

Next, the process in S106-S112 will be described for a case in which the variable State[1].L is 2 or 3. Since the process in S106-S112 has already been described, details of this process will be omitted, focusing on the method of setting the parameter value in the following description.

When the variable State[1].L is 2, the server name is "unknown" and the port number "110" as shown in (a-2) of FIG. 5 (the middle row of the parameter list). In this example, "aaa" is once again inputted as the server name, and the CPU 21 performs the connection process based on the server name "aaa" and the port number "110" (see. (a-3) of FIG. 5). If the connection process is successful. (S112: YES), the CPU 21 advances to S118. If the connection process is unsuccessful (S112: NO), in S113 the CPU 21 increments the variable State[1].L by 1 and repeats the connection process while specifying the parameter list indicated by the variable State[1].L of 3 (State[1].L=3). Specifically, a variable State[1].L of 3 specifies the bottom row of the parameter list in (a-1) of FIG. 5.

When the variable State[1].L is 3, the server name is "unknown" and the port number "unknown". In this example, we will assume the user inputs "bbb" for the server name and "80" for the port number. Accordingly, the CPU 21 performs the connection process based on the server name "bbb" and the port number "80" (see (a-4) of FIG. 5). If the connection process based on these values succeeds (S112: YES), the CPU 21 advances to S118. If the connection process is unsuccessful (S112 NO), in S113 the CPU 21 increments the variable State[1].L by 1. Since the variable State[1].L is now 4 (S114: YES), the variable n is decremented to 0. Since the current variable n(=0) is less than 1 (S516: YES) the CPU 21 executes the error display process in S117 and ends the connection setting process.

Next, steps from S118 will be described. When the CPU 21 determines in S112 that the parameter values for the current parameter list in the current state (one of S1-S4) is supported by the computer on the network (S112: YES), then in S118 the CPU 21 increments the variable n by 1 and substitutes Sx for State[n] as the next state in order to transition to the next state. Where Sx is one of S2, S3, S4, S5, and S6.

The value of the State[n] (Sx) is determined by the state transition data. When the next state predicated on a successful process in S1 is S2, S2 is substituted into State[n] as specified by the state transition data described above. Hence, a value 2 is stored in the variable n storage area 23a and S2 is stored in the second storage area of the array State[ ] storage area 23b.

In S119 the CPU 21 determines whether State[n] is the final state. That is, the CPU 21 determines whether State[n] is one of S5 and S6. If State[n] is not either the final state S5 or S6 (S119: NO), the CPU 21 returns to S104 to create parameter lists corresponding to S2-S4. In the process beginning from S105, the CPU 21 sets parameter values supported by the computer on the network.

However, if State[n] is the final states S5 or S6 (S119: YES), then the process for setting a connection corresponding to the computer on the network has ended. Therefore, if the current state is the state S5, in S120 the CPU 21 displays "Connection error" on the LCD 41. If the current state is the state S6, in S120 the CPU 21 displays "Connection established" on the LCD 41 and stores the parameter values in the settings data storage area 24a of the EEPROM 24. Subsequently, the CPU 21 ends the connection setting process.

Next, the process of S104-S117 will be described for the case when the value of State[n] is S2-S4. Since the process of S104-S117 has already been described, details of the process will be omitted, focusing only on the method of setting the parameter values.

When State[n] is S2, the CPU 21 executes the communication method determining process with the communication method as the setting. The communication method has the two parameter values "SSL" and "plain". Since "SSL" has the higher priority, the parameter list created in S104 is that indicated in (b) of FIG. 5. Hence, when the CPU 21 sets the variable State [n].L to 1 in S105 (specifying the top row of the parameter list in (b) of FIG. 5), the communication method determining process is executed in S111 since the parameter list does not include "unknown" (S106: YES). In the embodiment, the communication method selects the type of security, and "SSL" has a higher level of security than "plain".

In S111 the CPU 21 queries the computer on the network for which a connection has been established in state S1 to determine whether the communication method "SSL" is supported. If the communication method "SSL" is supported by the computer on the network (S112: YES), then in S118 the CPU 21 increments the variable n by 1, thereby transitioning to the state S3. However, if the communication method "SSL" is not supported by the computer on the network (S112: NO), then in S113 the CPU 21 sets the variable State[2].L to 2 and repeats the query for the communication method "plain".

Hence, if the computer on the network supports one of the communication methods "SSL" and "plain", the CPU 21 transitions to the state S3. However, if the computer does not support either of the communication methods "SSL" or "plain", then in S115 the CPU 21 decrements the variable n by 1, transitioning to the state S1. In the state S1, the CPU 21 specifies a new server name and a port number and again determines whether the computer on the network supports the communication methods "SSL" and "plain".

If the State[n] is S3, the CPU 21 performs the authentication method determining process with an authentication method as the setting. The authentication method has the three parameters "none", "plain", and "APOP". Since "none" has the highest priority, "plain" the next highest, and "APOP" the lowest, the parameter list created in S104 is that shown in (c) of FIG. 5. After setting the variable L to 1 in S105, the CPU 21 determines that the top row of the parameter list in (c) of FIG. 5 does not include "unknown" (S106: YES), and in S111 executes the authentication method determining process.

In S111 the CPU 21 queries the computer on the network determined to support the communication method set in the state S2 to determine whether the authentication method "none" is supported. While not indicated in the flowchart of FIG. 4, if the computer on the network supports "none", the CPU 21 advances directly to S120 without performing the process in S118, since the authentication method "none" allows data transmission and reception without authentication, and subsequently ends the connection setting process.

However, since "plain" and "APOP" require authentication, in S111 the CPU 21 determines whether these communication methods are supported by the computer on the network. If the computer supports at least one of the authentication methods "plain" or "APOP", in S118 the CPU 21 increments the variable n by 1, transitioning to the state S4.

However, if the computer does not support either of the authentication methods "plain" or "APOP", then in S115 the CPU 21 decrements the variable n by 1, transitioning to the state S2. In the state S2 the CPU 21 sets a new communication method and in the state S3 determines whether the computer on the network supports the authentication methods "none", "plain", or "APOP".

If the State[n] is S4, then the CPU 21 executes the login process with a username and a password as the settings. Since both the username and password are "unknown" in the embodiment (see (d-1) of FIG. 5), then the user is prompted to input the username and password in the process of S106-S110. In the following description, it will be assumed that the user inputs "yyyy" for the username and "zzzz" for the password (see (d-2) of FIG. 5)

In S111 the CPU 21 queries the computer on the network determined to support the authentication method set in the state S3 to determine whether the user can login with the username "yyyy" and the password "zzzz". If this username and password match a username and password stored in the computer on the network, then all processes are completed, and in S118 the CPU 21 increments the variable n by 1. Since the State[n] is the final state S6 (S119: YES), the CPU 21 advances to S120 and ends the connection setting process.

If the process corresponding to the State[n] is determined in S112 to have failed, then the CPU 21 decrements the variable n in S115. Therefore, the user can determine which setting value is problematic when setting a plurality of values. Accordingly, when a plurality of settings must be inputted to implement a prescribed function, the multifunction peripheral 1 of the invention can reduce the complexity and difficulty involved in the setup method.

In S114-115 only after the CPU 21 determines that all items in the parameter list for the current variable n do not supported on the computer, the CPU 21 decrements the variable n. Accordingly, the user complete the settings efficiently and quickly.

As described above, the multifunction peripheral 1 is configured to perform connection settings in the order of states S1-S4. Further, if the computer on the network does not support a parameter value (setting) in any of the states S2-S4, the CPU 21 transitions to the preceding state and sets new parameter values for this state. Since the user can recognize the transitions between states S1-S4, the user can determine in which state a value has not been supported by the computer on the network. Further, since the settings are performed in order until all settings axe completed for the computer on the network, the multifunction peripheral 1 of the invention can reduce the complexity and difficulties in the setup process.

Further, when there is a plurality of parameters for settings, a priority is assigned to the parameters. This priority is determined based on usage frequency and level of security. By selecting parameters having a higher frequency of usage, the multifunction peripheral 1 can complete the connection settings quickly. Further, by selecting parameters in order of level of security, the multifunction peripheral 1 can set the communication method and authentication method having the highest level of security supported by the computer on the network when the computer supports a plurality of such methods. Hence, the user can establish the highest level of security simply be performing the connection settings in order.

Figure 6:
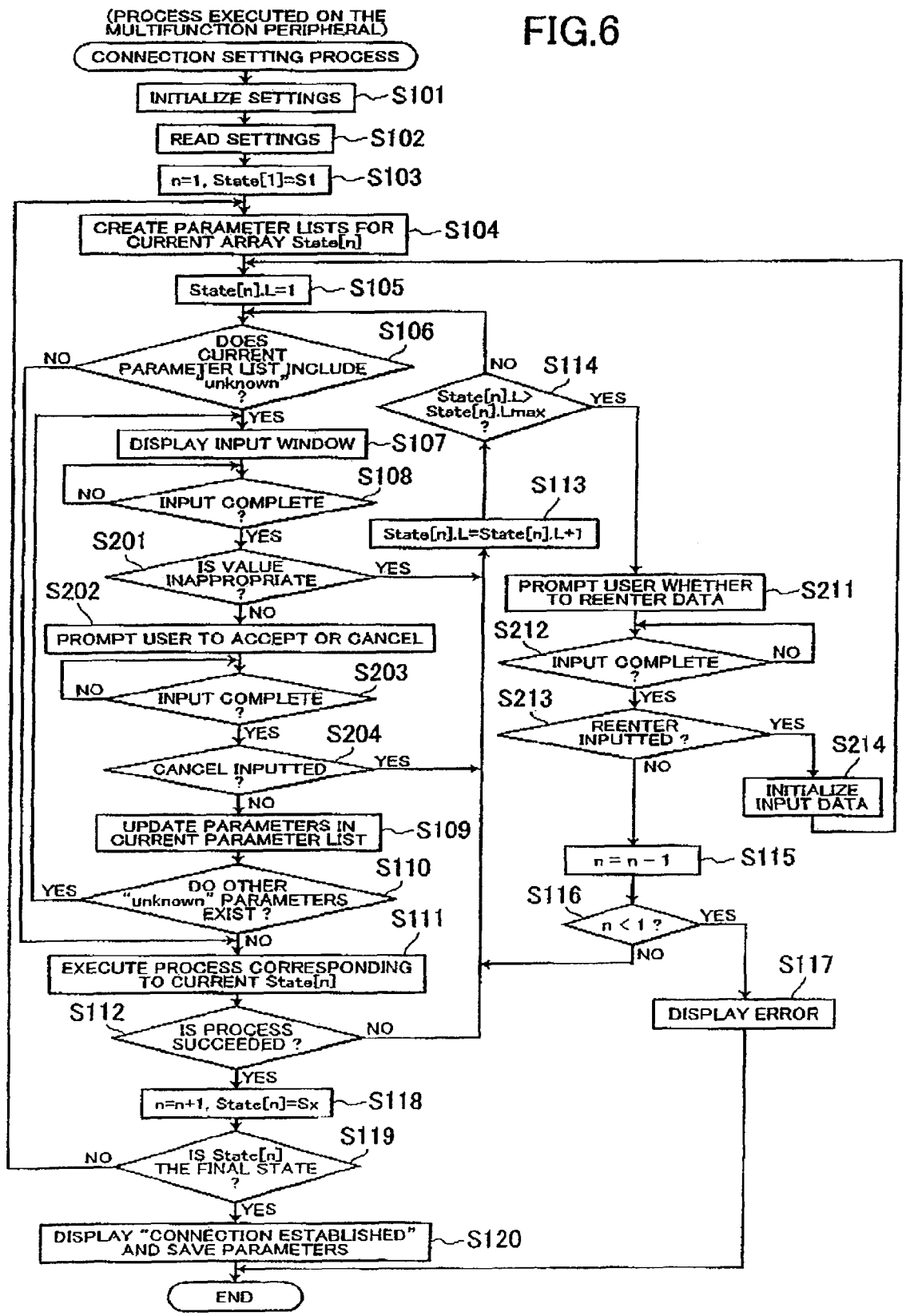
FIG. 6 is a flowchart illustrating steps in a connection setting process executed by the CPU in a multifunction peripheral according to a second embodiment.

Next, a second embodiment of the present invention will be described with reference to FIG. 6. In the second embodiment, the construction of the multifunction peripheral 1 is the same as that of the first embodiment. However, a connection setting process is different from that of the first embodiment. FIG. 6 is a flowchart illustrating steps in the connection setting process executed by the CPU 21 in a multifunction peripheral 1 according to the second embodiment.

In the connection setting process according to the first embodiment, in S102 the CPU 21 reads settings data stored in the settings data storage area 22a of the ROM 22 and state transition data stored in the state transition data storage area 22b of the ROM 22. However, in S102 of the second embodiment, the setting storage area 24a stores parameters for settings required for establishing a connection with a computer on the network instead of the data storage area 22a of the first embodiment and the CPU 21 reads settings data from the settings data storage area 24a of the EEPROM 24 and state transition data from the state transition data storage area 22b of the ROM 22. Specifically, when the user inputs values to the "unknown" parameter, subsequent connection settings are performed using the user-specified parameter. That is, in S120 the CPU 21 overwrites, in the settings data storage area 24a, the "unknown" parameters to the values that the user input Further, in the second embodiment, the CPU 21 determines whether the user-inputted value is inappropriate and queries the user as to whether to cancel the user-inputted parameter. If the parameter is canceled, the CPU 21 selects the next parameter. Further, in the second embodiment, the CPU 21 queries the user regarding whether to transition to the preceding state or to repeat the parameter setting in the current state when all parameters in the state S1-S4 fail. In the following description, steps in the connection setting process identical to those in the first embodiment are designated with the same step numbers to avoid duplicating description.

After completing the initialization step of S101 in the connection setting process according to the second embodiment, in S102 the CPU 21 reads the settings data stored in the settings data storage area 24a of the EEPROM 24 and the state transition data stored in the state transition data storage area 22b of the ROM 22.

In S106, even if the initial value of a setting is "unknown" and if the user has overwritten this value, the CPU 21 determines that the parameter list does not include "unknown" (S106: NO). Subsequently, the CPU 21 advances to S111. In some cases, a parameter value overwritten by the user may be supported by another computer on the network. For example, since some users may use the same username and password for different computers on the network, employing the parameter values overwritten by the user can eliminate the need for the user to overwrite "unknown" each time. Here, parameter values overwritten by the user may be assigned a priority higher than the other parameter values.

Next a configuration of the multifunction peripheral 1 according to the second embodiment will be described for the process in which the CPU 21 determines whether the user-inputted value is inappropriate and queries the user regarding whether to cancel the inputted parameter value. If the user cancels the parameter value, then the CPU 21 sets the next parameter value.

When the CPU 21 determines that the parameter list includes the value "unknown" (S106: YES) and the user completes input of a new parameter value (S108: YES), in S201 the CPU 21 determines whether the user-inputted parameter value is inappropriate. An inappropriate value may be a null value in which the user leaves the space blank without inputting a value or an alphabetical character inputted when only numerals are supported, for example.

In S201, when the CPU 21 determines that an inappropriate value has been inputted (S201: YES), the CPU 21 proceeds to S113 for setting the next parameter candidate. Thus, in the embodiment, the CPU 21 can reduce the number of unnecessary processes that are executed. This configuration reduces the control load on the CPU 21 and enables the CPU 21 to set a connection more quickly.

Hence, if the CPU 21 determines that an inappropriate value has been inputted (S201: YES), the CPU 21 advances to S113 to set the next parameter candidate. If an inappropriate value has not been inputted (S201: NO), then in S202 the CPU 21 displays a message on the LCD 41 prompting the user to accept or cancel the inputted parameter.

In S203 the CPU 21 determines whether the user has inputted a selection indicating whether to accept or cancel the newly inputted parameter and waits until input is complete (S203: NO). If the user has inputted a selection (S203: YES), then in S204 the CPU 21 determines whether the user selected "cancel". If the user selected "accept" (S204: NO) rather "cancel", then the CPU 21 advances to S109 and updates the values in the parameter list. However, if the user inputted "cancel" (S204: YES), then the CPU 21 advances to S113 to select the next parameter candidate without updating the parameter list.

By prompting the user to accept or cancel the inputted value, the multifunction peripheral 1 can eliminate the process of querying the computer on the network based on a parameter value that has been incorrectly inputted, for example.

Next, the configuration for querying the user regarding whether to transition to the preceding state or to repeat a parameter value setting in the current state when all parameter values have failed in the current state (one of S1-S4) will be described.

In the first embodiment, when the variable State[n].L is greater than the variable State[n].Lmax (S114: YES), the CPU 21 automatically transitions to the preceding state (one of S1-S3). On the other hand, in the second embodiment the CPU 21 displays a message on the LCD 41 in S211 prompting the user to re-input a parameter value for the current state (the current variable n). After displaying the message on the LCD 41 in S211, the CPU 21 determines in S212 whether the user has completed input and waits while the user has not completed input (S212: NO).

Once the user has completed input in S212 (S212: YES), in S213 the CPU 21 determines whether the user inputted a desire to reenter a parameter value for the current state (the current variable n). If the user did not indicate a desire to reenter a parameter value (S213: NO), then the CPU 21 advances to S115, transitioning to the preceding state.

However, if the user indicated a desire to reenter data (S213: YES), then in S214 the CPU 21 initializes the parameter value inputted for "unknown" in the current state S1-S4 (overwrites "unknown") and returns to S105. Hence, the CPU 21 resets the parameter value in the current state (one of S1-S4) without transitioning to a preceding state.

Hence, if the user wishes to set another parameter value for "unknown", for example, by indicating a desire to reenter a value the user can set a new parameter value without transitioning to the preceding state. Therefore, this configuration improves the user-friendliness of the connection setting process.

In the second embodiment described above, the CPU 21 is configured to read settings data stored in the settings data storage area 24*a* of the EEPROM 24 and to use parameter values overwritten by the user. However, it is also possible to store a new parameter value inputted by the user in association with "unknown" stored in the settings data storage area 24*a* of the EEPROM 24 and to read the settings data stored in the settings data storage area 22*a* of the ROM 22 in S102. With this configuration, when the CPU 21 determines that an "unknown" value exists in S106 (S106: YES), the CPU 21 reads and sets the parameter value stored in the settings data storage area 24*a* of the EEPROM 24 in association with this parameter value. The CPU 21 may also be configured to display the parameter value overwritten by the user on the LCD 41 and to confirm whether the user wishes to accept the displayed parameter value.

Further, in the second embodiment described above, the CPU 21 queries the user as to whether the user wishes to reenter data in S211, but the CPU 21 may instead display a message asking the user whether the user wishes to return to the beginning of the connection setting process. In S213 the CPU 21 determines whether the user wishes to return to the beginning of the connection setting process. If the user selects the option of returning to the start, in S213 the CPU 21 returns to S101 and executes the connection setting process from the beginning. If the user did not indicate a desire to return to the beginning of the connection setting process, the CPU 21 proceeds to S115. Alternatively, the CPU 21 may display in the process of S211 such options as "Reenter," "Start over," and "Continue." With this configuration, the CPU 21 determines after (or before) the process of S213 whether the user has selected "Start over." If the user has selected "Start over," then the CPU 21 returns to S101. If the user has selected "Continue," then the CPU 21 advances to S115 if the user has selected "Reenter", then the CPU 21 returns to S107.

Further, in connection setting process of the second embodiment described above, the multifunction peripheral 1 has additional configurations to those in the first embodiment, including a configuration for determining whether a user-inputted value is inappropriate, a configuration for asking the user whether to cancel an inputted parameter value and selecting the next parameter value when the user cancels the inputted value, and a configuration for asking the user whether to transition to the preceding state or reset a parameter in the current state when all parameter values in the current state (one of S1-S4) failed. However, the multifunction peripheral 1 may. include any one or a plurality of these configurations in addition to the structure in the first embodiment.

Further, the multifunction peripheral 1 according to the second embodiment described above may include the options of "Reenter" and "Start over" in addition to "Cancel" in S204. If the user has selected "Start over", the CPU 21 returns to S101. If the user has selected "Continue," then the CPU 21 advances to S109. If the user has selected "Reenter", then the CPU 21 returns to S107.

In S102 of the second embodiment described above, the CPU 21 reads the settings data stored in the settings data storage area 24*a* of the EEPROM 24. However, the user is unable to input new parameter values when none of the settings stored in the settings data storage area 24*a* are "unknown". Thus, it is preferable that the value "unknown" be added to each setting stored in the settings data storage area 24*a*.

While the invention has been described in detail with reference to the above embodiments thereof, it would be apparent to those skilled in the art that various changes and modifications may be made therein without departing from the spirit of the invention.

For example, in the embodiments described above, the CPU 21 transitions to the preceding state when all parameter candidates for a setting have been selected in one of the states S1-S4 and all parameters failed. However, if the states S1-S3, for example, are related to each other, the CPU 21 may transition to the state S1 rather than the previous state S2 when all parameters have failed in the state S3. That is, the CPU 21 returns to an initial state (S1) among the related states, when all parameters have failed in any related states. In this case, it is preferable to store data indicating the beginning and ending states among related states in the array State[ ] storage area 23*b*. In other words, the CPU 21 may be configured to return to the beginning state after determining that all parameters have failed in any of the states between the beginning state and the ending state (including the ending state) among the related states.

The plurality of settings and priorities for these settings may also be displayed on the LCD 41.

While the embodiments describe a connection method for connecting the multifunction peripheral 1 to a computer on the network, the present invention is not limited to this construction. For example, the present invention may be applied to settings or the like needed for using a peripheral device connected to a personal computer. In this case, parameter values required for these settings are used.

What is claimed is:

1. A data processor that requires setting a plurality of items to a plurality of data sets in order to implement a prescribed function, the data processor comprising:

a setting unit that sets an item to a data set;

a determining unit that determines whether a data set which is set for an item by the setting unit satisfies a prescribed condition required for the data set of the item;

a first prompting unit that prompts the setting unit to change the setting of an item from the currently setting item by the setting unit to remaining one of the plurality of items other than the currently setting item when the determining unit determines that a data set which is set for the currently setting item satisfies a prescribed condition for the data set of the currently setting item;

a second prompting unit that prompts the setting unit to change a setting of an item from the currently setting item by the setting unit to one of the items that has been previously set by the setting unit when the determining unit determines that a data set which is set for the currently setting item is out of conformance with a prescribed condition for the data set of the currently setting item;

an order storing unit storing an order of items, wherein the setting unit sets an item based on the order of items stored in the order storing unit; and a third prompting unit prompting the setting unit to change a setting of an item, wherein the plurality of items includes at least three related items which relate to one another and at least one independent item which is independent of the at least three related items, the at least three related items being arranged successively according to the order of items, wherein when the setting unit sets a related item and when the determining unit determines that a data set which is set for the related item currently set by the setting unit is out of conformance with a prescribed condition required for a data set of the related item currently set by the setting unit, the third prompting unit prompts the setting unit to change a setting of an item from the related item currently set by the setting unit to another related item that is an initial item, according to the order of items, among the at least three related items.

2. The data processor as claimed in claim 1, further comprising a storing unit that stores at least one candidate for a data set, wherein the setting unit that sets an item to one candidate as a data set;

wherein the determining unit that determines whether one candidate set as a data set for an item by the setting unit satisfies a prescribed condition required for the data set of the item;

wherein the first prompting unit that prompts the setting unit to change the setting of an item from the currently setting item by the setting unit to remaining one of the plurality of items other than the currently setting item when the determining unit determines that one candidate set as a data set for the currently setting item satisfies a prescribed condition for the data set of the currently setting item; and wherein the second prompting unit that prompts the setting unit to change a setting of an item from the currently setting item by the setting unit to one of the items that has been previously set by the setting unit when the determining unit determines that one candidate set as a data set for the currently setting item is out of conformance with a prescribed condition for the data set of the currently setting item.

3. The data processor as claimed in claim 2, further comprising:

an assigning unit assigning a priority to each of at least one candidate, the priority including a plurality of grades from highest grade to lowest grade; and wherein the setting unit sets an item to a candidate in order from a highest grade of a priority; and wherein the second prompting unit prompts the setting unit to change the setting of an item from a currently setting item by the setting unit to one of items that has been previously set by the setting unit when the determining unit determines that each candidate for the currently setting item by the setting unit is out of conformance with a prescribed condition for a data set of the currently setting item.

4. The data processor as claimed in claim 3, further comprising an associating unit associating a candidate that has been determined by the determining unit with a result of the determination of the candidate by the determining unit, wherein the setting unit sets an item to a candidate other than the candidate associated with the result of the determination.

5. The data processor as claimed in claim 1, wherein one of the items to which the second prompting unit prompts to change is determined based on an order stored in the order storing unit.

6. The data processor as claimed in claim 1, further comprising a notifying unit issuing a notification when the determining unit determines that a data set, which is set for a currently setting item that is initially set by the setting unit, is out of conformance with a prescribed condition required for a data set of the currently setting item.

7. The data processor as claimed in claim 1, further comprising:

a fourth prompting unit prompting the setting unit to change a setting of the item from a currently setting item to an initial item among items in an order stored in the storing unit when the determining unit determines that each candidate for a currently setting item by the setting unit is out of conformance with a prescribed condition for a data set of the currently setting item.

8. The data processor as claimed in claim 1, wherein the data processor is capable of being connected to and communicating with an external device, the data processor further comprising a receiving unit receiving information about an item from the external device; and the determining unit determines whether an item set by the setting unit satisfies a prescribed condition for a data set of the item based on the information received from the external device.

9. A method for controlling a data processor that requires setting a plurality of items to a plurality of data sets in order to implement a prescribed function, the data processor including an order storing unit storing an order of items, the method comprising:

(a) setting an item to a data set based on the order of items;
(b) determining whether a data set which is set for an item by the setting satisfies a prescribed condition required for the data set of the item;
(c) prompting the setting to change the setting of an item from the currently setting item by the setting to remaining one of the plurality of items other than the currently setting item when the determining determines that a data set which is set for the currently setting item satisfies a prescribed condition for the data set of the currently setting item;
(d) prompting the setting to change a setting of an item from the currently setting item by the setting to one of the items that has been previously set by the setting when the determining determines that a data set which is set for the currently setting item is out of conformance with a prescribed condition for the data set of the currently setting item; and
(e) prompting the setting to change a setting of an item, wherein the plurality of items includes at least three related items which relate to one another and at least one independent item which is independent of the at least three related items, the at least three related items being arranged successively according to the order of items, wherein when the setting step (a) sets a related item and when the determining step (b) determines that a data set which is set for the related item currently set by the setting unit is out of conformance with a prescribed condition required for a data set of the related item currently set by the setting step (a), the prompting step (e) prompts the setting step (a) to change a setting of an item from the related item currently set by the setting unit to another related item that is an initial item, according to the order of items, among the at least three related items.

10. A non-transitory computer-readable storage medium storing a set of program instructions executable on a data processor that requires setting a plurality of items to a plurality of data sets in order to implement a prescribed function, the data processor including an order storing unit storing an order of items, the program instructions comprising:

(a) setting an item to a data set based on the order of items;
(b) determining whether a data set which is set for an item by the setting satisfies a prescribed condition required for the data set of the item;
(c) prompting the setting to change the setting of an item from the currently setting item by the setting to remaining one of the plurality of items other than the currently setting item when the determining determines that a data set which is set for the currently setting item satisfies a prescribed condition for the data set of the currently setting item;
(d) prompting the setting to change a setting of an item from the currently setting item by the setting to one of the items that has been previously set by the setting when the determining determines that a data set which is set for the currently setting item is out of conformance with a prescribed condition for the data set of the currently setting item; and
(e) prompting the setting to change a setting of an item, wherein the plurality of items includes at least three related items which relate to one another and at least one independent item which is independent of the at least three related items, the at least three related items being arranged successively according to the order of items, wherein when the setting instruction (a) sets a related item and when the determining instruction (b) determines that a data set which is set for the related item currently set by the setting unit is out of conformance with a prescribed condition required for a data set of the related item currently set by the setting instruction (a), the prompting instruction (e) prompts the setting instruction (a) to change a setting of an item from the related item currently set by the setting unit to another related item that is an initial item, according to the order of items, among the at least three related items.

* * * * *